Jan. 19, 1965    J. L. GALEZNIAK    3,166,620
PIPE CUTTING APPARATUS
Filed Sept. 26, 1962    3 Sheets-Sheet 3

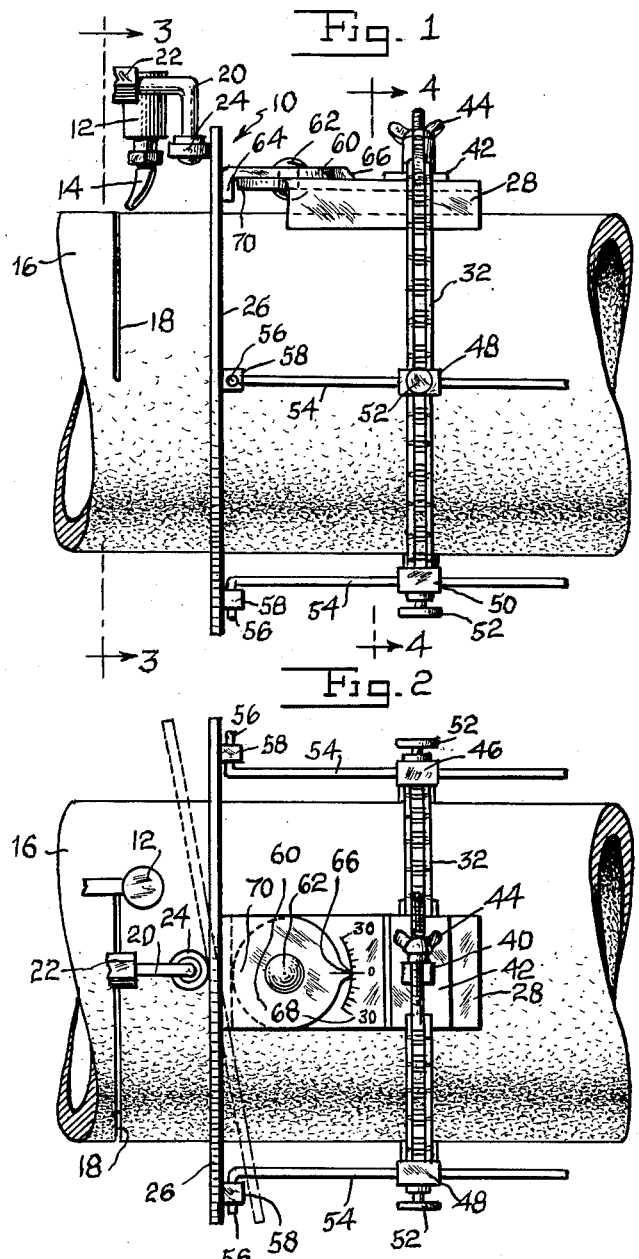

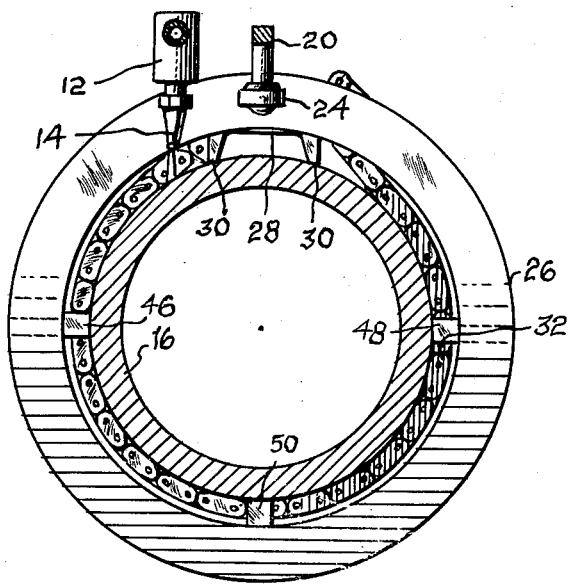
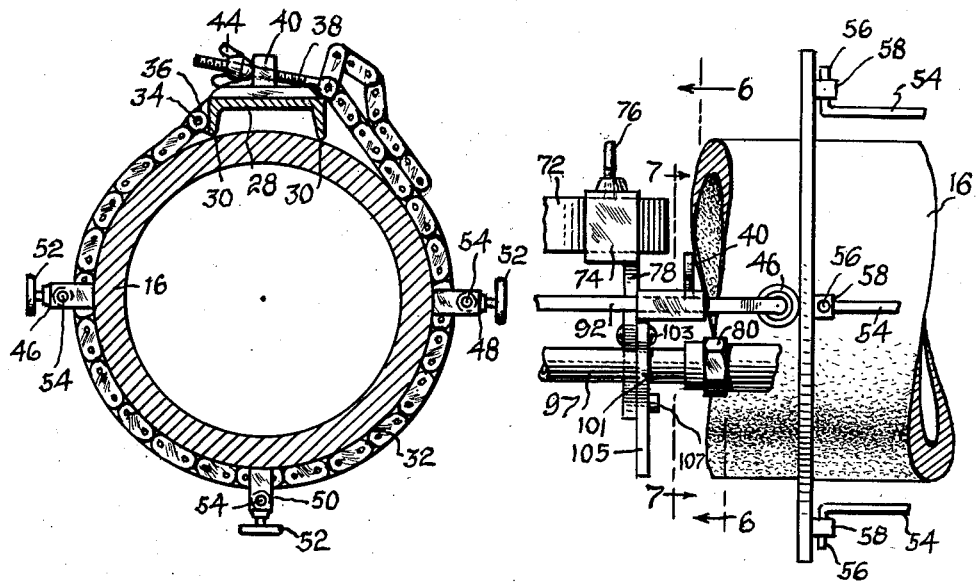

INVENTOR.
Joseph Galezniak

United States Patent Office 3,166,620
Patented Jan. 19, 1965

3,166,620
PIPE CUTTING APPARATUS
Joseph L. Galezniak, 1104 Newton Ave.,
West Collingswood, N.J.
Filed Sept. 26, 1962, Ser. No. 226,281
4 Claims. (Cl. 266—23)

This invention relates to improvements in pipe cutting apparatus and relates more particularly to an apparatus that will, by means of an oxyacetylene torch, make straight, angular or saddle cuts of varying pitch in pipe or other cylindrical articles. This application is a continuation-in-part of the subject matter of a preceding application for Letters Patent, S.N. 856,702, filed December 2, 1959.

It is an object of this invention to provide a device of this character that will make cuts in pipe or the like along predetermined lines.

Another object of the instant invention is the provision of a guide means for an oxyacteylene torch which may be shifted in angular relation with respect to the longitudinal axis of the pipe.

A further object of this invention is to provide a guide means for an oxyacetylene torch which may be quickly and easily adjusted to cause the torch to cut the pipe in saddle configuration.

A still further object of this invention is the provision of a guide means for saddle-shaped cuts wherein the pitch of the saddle may be readily varied.

Another object of the invention is to provide a device of this character which is simple in construction, efficient in operation and economical to manufacture.

Other and further objects reside in the combination of elements, arrangement of parts and features of construction.

Still other objects will in part be obvious, and in part be pointed out, as a description of the invention proceeds as shown in the accompanying drawings where there are disclosed preferred embodiments of this inventive concept.

In the drawing:

FIGURE 1 is a longitudinal side elevational view of a pipe cutting apparatus embodying the instant invention in position on a piece of pipe to be cut;

FIGURE 2 is a longitudinal top plan view of the device shown in FIGURE 1;

FIGURE 3 is a vertical sectional view on the line 3—3 of FIGURE 1;

FIGURE 4 is a vertical sectional view on the line 4—4 of FIGURE 1;

FIGURE 5 is a fragmentary longitudinal side elevational view of a modified form of guide ring and cutting assembly;

Similar reference characters refer to similar parts throughout the several views of the drawing.

Figure 8:
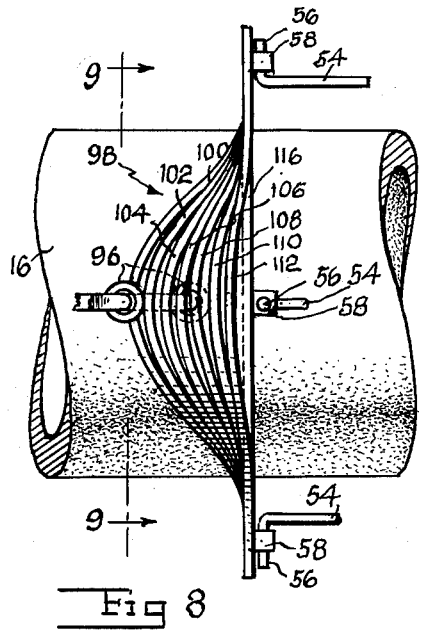
FIGURE 8 is a fagmentary longitudinal side elevational view of the modification of FIGURE 5 showing the variable pitch saddle-shaped guide ring.
Figure 6:
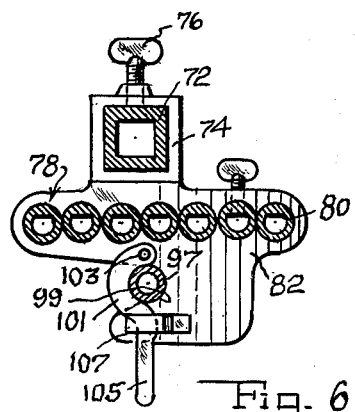
FIGURE 6 is a vertical sectional view on the line 6—6 of FIGURE 5.

Referring now to the drawings in detail and more particularly to FIGURE 1 the reference numeral 10 is used to designate a pipe cutting apparatus embodying the invention.

An oxyacetylene torch 12 having a cutting nozzle 14 on one end is mounted at its rear in a moveable carriage (not shown). Means (not shown) are associated with the carriage to cause the same, and thereby the torch 12, to roll around the pipe 16 and cut the surface thereof as shown for example at 18 in FIGURES 1 and 2. An L-shaped bar 20 has one end clamped at 22 and a horizontally disposed roller 24 rotatably mounted on its opposite end. The bar 20 and its associated roller 24 are resiliently urged toward the guide by means not shown into rolling engagement therewith.

Figure 9:
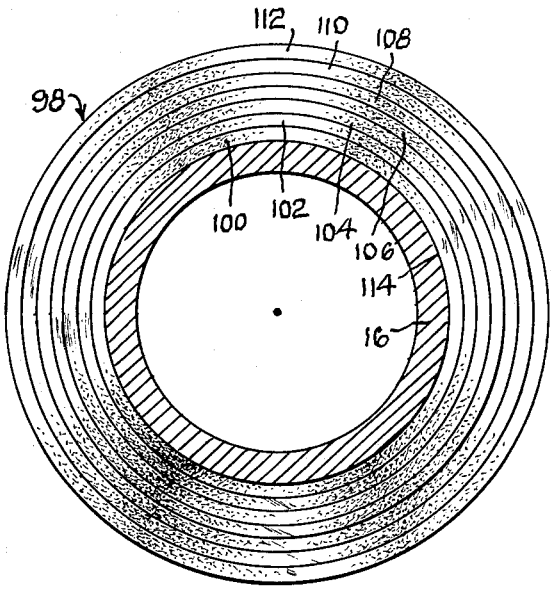
FIGURE 9 is a vertical sectional view on the line 9—9 of FIGURE 8.

One form of a carriage for supporting the torch 12 in rollable relationship with regard to the surface of the pipe 16 and means for urging the bar 20 toward the plate 26 is shown in the earlier application, Serial No. 856,702, filed December 2, 1959, of which this application forms a continuation-in-part. Reference may be had thereto for a full description of how the torch 12 is associated with the bar 20. Since these means form no part of the instant invention it will suffice to indicate that the shape of the cut 18 made by the torch 12 will be determined by the path which the roller 24 is forced to travel by the guide means 26. Thus, if the guide means are transversely positioned with respect to the longitudinal axis of the pipe 16 as shown in full lines in FIGS. 1 and 2, the cut made by the torch 12 will be straight as shown at 18. If the guide plate is adjusted with respect to the longitudinal axis of the pipe as shown by dashed lines in FIG. 2, the roller 24 will cause the torch 12 to follow a corresponding angular path. And if the guide means are saddle-shaped as shown in FIGURES 8 and 9, the cut made by the torch 12 will correspond thereto.

The guide plate 26 is mounted on the pipe 16 in the following manner. A channel shaped mounting plate 28, having parallel shaped edges 30, is set on the pipe 16 so that edges 30 engage the surface thereof, not particularly FIGURE 4. One end of a link chain 32 is pivotally connected at 34 to apertured ear 36 on the plate 28 and the chain 32 is then wrapped around the pipe 16. A screw chain tightener 38 connected to the chain 32 engages the bifurcated ear 40 on a transversely extending mounting plate 42 that is secured to the upper surface of the plate 28. A wing nut 44 on the screw 38, when rotated, will tighten the chain 32 in the usual manner.

Mounting brackets 46, 48 and 50 are mounted at three (3) radial positions on the chain 32 and each bracket has a bore which is opened to permit an end of a set screw 52 mounted in each of the brackets to pass therethrough. The set screw 52 will engage a rod 54 that is slidably mounted in each of the bores of the brackets 46, 48 and 50. Each of the rods 54 has a right-angularly disposed end portion 56 which is slidably mounted in an apertured block 58. The blocks 58 correspond in number to the brackets 46, 48 and 50 on the roller chain 32 so that there are three radially disposed blocks 58.

Each of the blocks 58 are secured to the rear surface of the ring-shaped guide 26 so that the blocks 58 and rods 54 are radially aligned with each other. The guide 26 is placed on the pipe 16 in circumjacent relation thereto so that the guide 26 may be engaged by the roller 24 as hereinbefore described.

While each of the guides are shown in the drawings as an integral ring it is to be understood that they may be split diametrically, hinged at one side with a spring lock at the other, to facilitate mounting the device on a stationary pipe having both ends so obstructed that the guide plate cannot be slid thereover.

A plate 60 is pivotally mounted at 62 on the plate 28 and one end of the plate 60 has a right-angularly disposed flange 64 secured to the rear surface of the guide 26 at the remaining radial point not occupied by a block 58. Note FIGURE 1. The opposite end of the plate 60 is curved to form a pointer 66 which coacts with arcuate measuring guide 68 extending zero degrees to 30 degrees, both right and left of the zero degree mark. Note FIGURE 2.

The end of the plate 28 underlying the plate 60 has a rounded portion 70 coinciding with the curvature of that portion of the plate 60 which forms the pointer 66 to permit pivotal motion around the pivot 62.

In the operation of the pipe cutting machine, the device is mounted on the pipe 16 so that the cutting torch 12 will coincide with the line on the pipe 16 to be cut.

The guide 26 can be pivoted at 62 to provide guiding means for making a cut from zero degrees that is, a straight cut as shown in FIGURE 1, to 30 degrees right or left of the zero degree mark. Note the dashed lines in FIGURE 2. The set screw 52 will be tightened to engage the rods 54 and thus the plate 26 will be retained at the setting determined by the pointer 66 and the measuring guide 68.

Therefore, as the carriage supporting the cutting torch 12 is rolled around the surface of pipe 16, the roller 24 under constant urging pressure from means not shown, follows the guide ring 26 to guide the cutting torch 12 and cut the desired line.

The guide ring 26 and its assembly can be easily mounted on or removed from a pipe as hereinbefore described and the machine 10 may thus be set to make any desired straight or angular cut.

In FIGURES 5-9 inclusive, a guide ring assembly is shown that is adapted to make saddle cuts on all sizes of pipes. Except for details to be hereinafter described, the structure of the pipe cutting apparatus is as previously set forth.

A horizontally disposed bar 72 fixed for rotative movement with respect to the surface of the pipe 16, with the aforementioned carriage, is mounted for sliding adjustment in a square-shaped mounting socket 74 in which is disposed a set screw 76 whereby the socket 74 may be secured in fixed relation to the bar 72. Note FIGURES 5 and 6. A mounting plate 78 is formed integral with the socket 74 and has a row of horizontally disposed, spaced mounting sockets 80 in the lower portion 82. The sockets 80 are positioned in parallel relationship to the bar 72. Each of the sockets 80 has a bore 84 with a flat portion 86. A threaded bore 88 communicates with each of the bores 84 transversely thereof through the flat portion 86 to accommodate a set screw 90.

Figure 7:
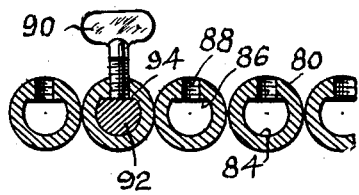
FIGURE 7 is an enlarged cross-sectional view of a portion of the mounting plate taken on the line 7—7 of FIGURE 5.

A rod 92 having a flat side 94 is selectively mounted in one of the sockets 80, the flat portion 94 of the rod 92 being in engagement with the flat portion 86 of the bore 84 as shown in FIG. 7. A roller 96 is rotatably mounted on the forward end of the rod 92 and the entire structure is resiliently biased to urge the roller 96 into engaging contact with the guide ring in the manner previously described with reference to the roller 24 and the guide ring 26.

The supply pipe 97 of the oxyacetylene torch 12 extends through an opening 99 in the mounting plate 78 and a semi-circular clamp 101, pivoted at 103 on the plate 78, engages the supply pipe 97. A handle 105 of the clamp 103 is grasped by the operator so that the clamp 103 may be moved into engagement with the pipe. Note FIG. 6. A spring latch 107 that is rigidly secured to the mounting plate 78 holds the semi-circular clamp 101 into positiion. The cutting nozzle of the oxyacetylene torch has not been shown in these figures for simplification of illustration but will be similar in kind to the nozzle 14 shown in FIGURE 1.

The guide ring in FIGURE 5 has been shown as flat similar to the guide ring 26 in FIG. 1 for simplification of illustration. In FIGS. 8 and 9, the modified form of saddle shaped guide ring indicated generally at 98 is shown in detail. The guide ring 98 is provided with a plurality of individual rings 100, 102, 104, 106, 108, 110 and 112 corresponding in number to the number of mounting sockets 80 in the mounting plate 78. The rings 100-112 are radially spaced with respect to a bore 114 having a diameter equivalent to the outer diameter of the pipe 16. A different guide ring will be used for each pipe diameter formed to provide a saddle cut having one of a variety of pitches depending on which ring the roller 96 is made to ride on. Each of the mounting sockets 80 is radially aligned with one of the rings 100-112. By selectively inserting the rod 92 through a chosen mounting socket 80 a saddle cut of desired pitch may be formed on the pipe 16.

The guide ring 98 may have a flat back plate such as 116 in FIG. 8 on which the blocks 58 are mounted or the blocks 58 may be mounted directly on the rear of one of the rings 100-112.

The outer ring 112 can be flat to enable the operator to make a straight cut without changing the guide assembly. Also, it will be seen that the guide assembly may be pivoted in the manner described for the plate 26 to provide an angular saddle cut if such is desired.

As previously stated, except for the elements specifically described with respect to FIGS. 5-9, the pipe cutting apparatus 10 remains the same and thus the cutting of the pipe by the pipe cutting assembly is regulated by the roller 96 as shown in FIGURE 8.

The roller in solid lines is on the second ring 102 forming a saddle cut of relatively deep pitch. This ring is aligned with the second mounting socket 80 shown in FIGURES 6 and 7 as having the rod 92 passing therethrough. The roller 96 is shown in dotted lines as engaging one of the other rings such as 110 which could be easily accomplished by passing the rod 92 through its associated mounting socket 80.

It is now seen that there is herein provided a device which accomplishes all of the objects of the instant invention and others, including many advantages of great practical utility and commercial importance.

Since many embodiments may be made of this inventive concept, and since many modifications may be made in the embodiments herein shown and described, it is to be understood that all matter herein is to be interpretated as merely illustrative and not in a limiting sense.

I claim:

1. In a pipe cutting machine having a cutting means and means to cause said cutting means to move circumferentially around a pipe, a guide means comprising a roller operatively connected to said cutting means to guide the movement of said cutting means as said cutting means moves around said pipe, a guide ring, means for mounting said guide ring on said pipe in circumjacent relation thereto, and means for maintaining said roller in engagement with said guide ring as said cutting means is moved around said pipe, means for retaining said ring in angularly adjusted position in relation to the longitudinal axis of said pipe including a link chain, means for wrapping said chain around said pipe in gripping relation thereto, a plurality of brackets spaced circumferentially around said link chain, a plurality of brackets fixed to said guide ring, one of said guide ring brackets aligned with each of said link chain brackets, rod means fixed to each of said guide ring brackets and slidably engaged with its aligned link chain bracket, means for angularly adjusting said guide ring in relation to the longitudinal axis of said pipe and means in each of said guide ring brackets for securing said rod means in its adjusted position.

2. A pipe cutting machine in accordance with claim 1 wherein said guide means is saddle-shaped in configuration.

3. In a pipe cutting machine having a cutting means and means to cause said cutting means to move circumferentially around a pipe, a guide means comprising a roller operatively connected to said cutting means to guide the movement of said cutting means as said cutting means moves around said pipe, a guide ring, means for mounting said guide ring on said pipe in circumjacent relation thereto, and means for maintaining said roller in engagement with said guide ring as said cutting means is moved around said pipe, said guide means including a plurality of saddle-shaped guide rings of different pitch and means are provided for selectively engaging said roller in contact with one of said guide rings.

4. In a pipe cutting machine having a cutting means and means to cause said cutting means to move circumferentially around a pipe, a guide means comprising a roller operatively connected to said cutting means to guide the movement of said cutting means as said cutting means moves around said pipe, a guide ring, means for mounting said guide ring on said pipe in circumjacent relation thereto, and means for maintaining said roller in engagement with said guide ring as said cutting means is moved around said pipe, said guide means including a plurality of radially spaced, saddle-shaped guide rings of different pitch, a mounting plate for said cutting means in association with said means to cause said cutting means to move circumferentially around said pipe, said mounting plate having a plurality of spaced mounting sockets, one of said mounting sockets longitudinally aligned with each of said guide rings, a spring-biased bar selectively mounted in one of said mounting sockets and said roller rotatably mounted on the end of said bar in sliding engagement with one of said rings.

References Cited in the file of this patent
UNITED STATES PATENTS

| | | |
|---|---|---|
| 1,692,925 | Brown | Nov. 27, 1928 |
| 2,408,517 | Howard | Oct. 1, 1946 |